United States Patent [19]
Citta

[11] Patent Number: 5,258,838
[45] Date of Patent: * Nov. 2, 1993

[54] HDTV TRANSMISSION SYSTEM WITH REDUCED NTSC CO-CHANNEL INTERFERENCE

[75] Inventor: Richard W. Citta, Oak Park, Ill.

[73] Assignee: Zenith Electronics Corporation, Glenview, Ill.

[*] Notice: The portion of the term of this patent subsequent to Jun. 9, 2009 has been disclaimed.

[21] Appl. No.: 802,153

[22] Filed: Dec. 4, 1991

Related U.S. Application Data

[63] Continuation of Ser. No. 600,458, Oct. 19, 1990, Pat. No. 5,121,203.

[51] Int. Cl.[5] .......................... H04N 5/21; H04N 7/00
[52] U.S. Cl. ...................................... 358/141; 358/167
[58] Field of Search ................................ 358/141, 167

[56] References Cited

U.S. PATENT DOCUMENTS

| | | | |
|---|---|---|---|
| 4,343,019 | 8/1982 | Lagoni | 358/31 |
| 5,029,002 | 7/1991 | Citta et al. | 358/141 |
| 5,121,203 | 6/1992 | Citta | 358/167 |

Primary Examiner—John Shepperd

[57] ABSTRACT

A precoded N-level HDTV digital video signal characterized by a sampling rate fs substantially equal to 3/2 the NTSC color subcarrier frequency is modulated for transmission on a carrier signal having a frequency substantially mid-way between the picture carrier and color subcarrier of an NTSC co-channel. The received signal is detected by a synchronous detector in response to a regenerated carrier signal and interfering NTSC beat components in the output of the detector are attenuated by a comb filter having a notch at fs/3. The output of the comb filter comprises an M-level signal, where M is greater than N, which is converted to an N-level signal corresponding to the demodulated video signal.

30 Claims, 5 Drawing Sheets

HDTV TRANSMISSION SYSTEM WITH REDUCED NTSC CO-CHANNEL INTERFERENCE

CROSS REFERENCE TO RELATED APPLICATIONS

This application is a continuation of application Ser. No. 600,458, filed Oct. 19, 1990, now U.S. Pat. No. 5,121,203, and is related to co-pending application Ser. No. 600,469, filed Oct. 19, 1990, now U.S. Pat. No. 5,132,797; entitled "Co-Channel Interference Filter for Digital High Definition Television Receiver" and to application Ser. No. 601,169, filed Oct. 19, 1990, now U.S. Pat. No. 5,086,340, entitled "Co-Channel Interference Reduction System for Digital High Definition Television", both of which applications are assigned to the assignee of the present application and which are incorporated herein by reference.

BACKGROUND OF THE INVENTION

The present invention generally relates to television signal transmission systems and particularly concerns a system for reducing the effects of co-channel interference in a high definition television signal receiver.

Simulcast broadcasting is a technique which has been proposed for providing high definition television services without obsoleting the large installed base of NTSC receivers. Simply put, simulcast broadcasting contemplates simultaneous transmission of identical program material encoded in two different formats over respective 6 MHz television channels. Thus, for example, a particular program may be encoded in NTSC format for transmission over a first 6 MHz television channel and in an HDTV format for transmission over a second different 6 MHz television channel. Viewers equipped only with NTSC receivers would therefore be able to receive and reproduce the program encoded in NTSC format by tuning the first channel, while viewers equipped with HDTV receivers would be able to receive and reproduce the same program encoded in HDTV format by tuning the second channel.

The foregoing, of course, contemplates the allocation of additional 6 MHz television channels for the transmission of HDTV encoded signals within a given NTSC service area. While such additional channels are generally available for this purpose, at least some of the same channels are also quite likely to be allocated for NTSC transmissions in nearby television service areas. This raises the problem of co-channel interference where HDTV and NTSC transmissions over the same channel in nearby television service areas interfere with one another. NTSC co-channel interference into a received HDTV signal is of particular concern due to the relatively large picture and color carriers characterizing an NTSC transmission. HDTV systems employing an all digital transmission standard further add to this concern, since excessive NTSC co-channel interference from a nearby transmitter could abruptly render an HDTV receiver incapable of reproducing any image rather than gradually degrading the signal-to-noise performance of the receiver.

OBJECTS OF THE INVENTION

It is therefore a basic object of the present invention to provide an improved simulcast television signal transmission system.

It is a further object of the invention to reduce the effects of co-channel interference in a simulcast television signal transmission system.

It is still a further object of the invention to reduce the effects of co-channel interference caused by the picture and color carriers of an NTSC signal in an HDTV receiver.

It is yet another object of the invention to reduce the effects of co-channel interference caused by an NTSC signal in an HDTV receiver operable for reproducing an image in response to an all digital HDTV transmission standard.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENTS

Figure 1:
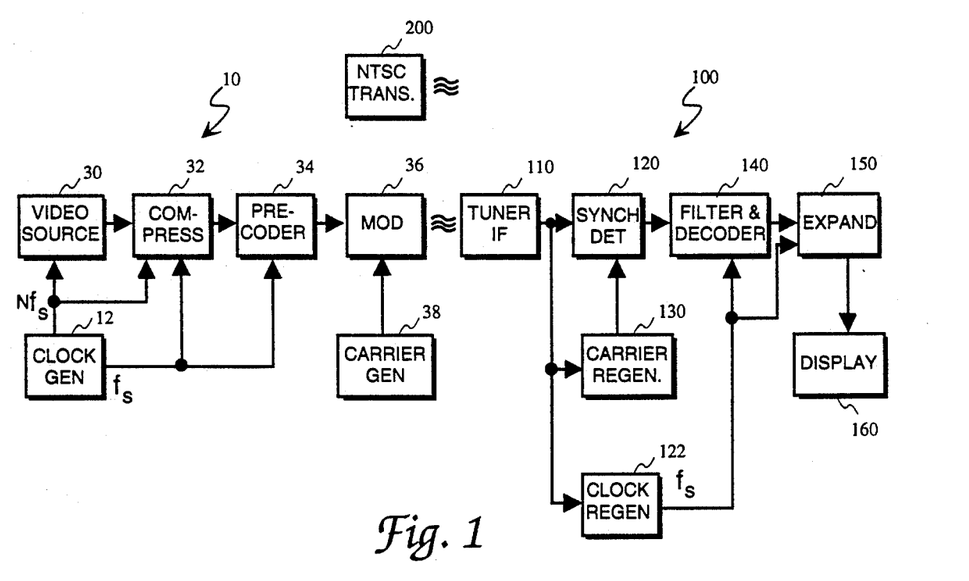
FIG. 1 is a block diagram of a television signal transmission system constructed in accordance with the invention.

The problem addressed by the present invention is generally illustrated in the block diagram of FIG. 1. An HDTV transmitter, designated generally by reference numeral 10, broadcasts an HDTV encoded signal over a selected 6 MHz television channel for reception and reproduction by a corresponding HDTV receiver 100 tuned to the selected channel. At the same time, an NTSC transmitter 200 broadcasts an NTSC encoded signal over the same channel in a nearby television service area. Depending on its physical location, the HDTV receiver 100 may thus receive an undesired interfering component of considerable strength from the NTSC transmitter 200 in addition to the desired signal from HDTV transmitter 10. Since the undesired interfering signal is transmitted on the same channel as the desired HDTV signal, it is commonly referred to as co-channel interference. The co-channel interfering signal in the HDTV receiver especially poses a problem in the case where an all digital HDTV transmission standard is employed. In particular, if the co-channel interfering signal is of sufficient strength to "swamp out" the digital HDTV signal in the receiver, the ability of the receiver to reproduce an image of any quality may be completely compromised. Moreover, this impairment of the HDTV receiver may arise quite abruptly with variations in the strength of the interfering NTSC co-channel signal. This is in contrast to analog HDTV transmission systems in which variations in the strength of the interfering NTSC co-channel signal cause gradual changes in the signal-to-noise performance of the receiver.

Figure 2:
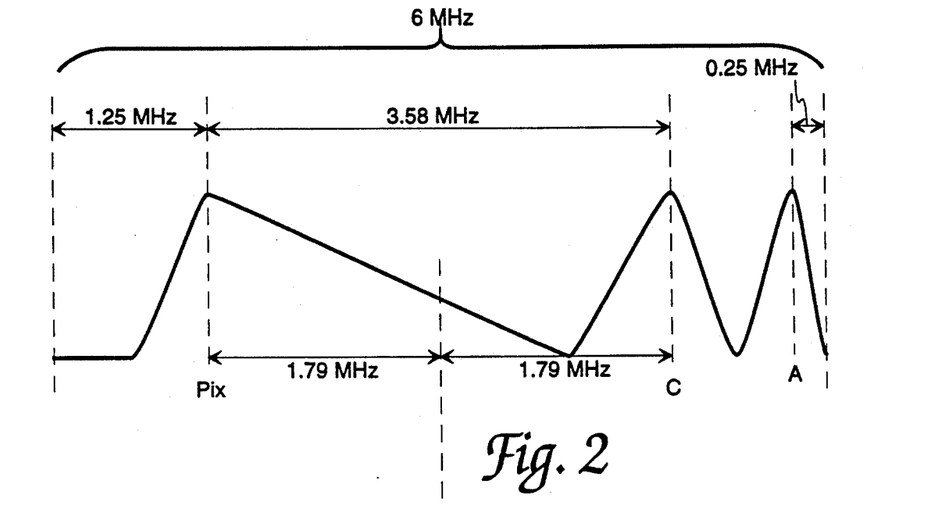
FIG. 2 is a graph illustrating the spectrum of a 6 MHz NTSC television channel.

The spectrum of the interfering NTSC co-channel signal is illustrated in FIG. 2. This spectrum occupies a 6 MHz television channel and includes a luma component, a chroma component and an audio component. The luma component has a bandwidth of about 4 MHz and is modulated on a picture carrier spaced 1.25 MHz from one end of the channel. The chroma component, which has a bandwidth of about 1 MHz, is modulated on a subcarrier spaced about 3.58 MHz from the picture carrier. The audio component is modulated on a carrier spaced 0.25 MHz from the other end of the channel (i.e. 4.5 MHz from the picture carrier). The major contributors to co-channel interference are the relatively large NTSC picture carrier and chroma subcarrier.

Figure 3:
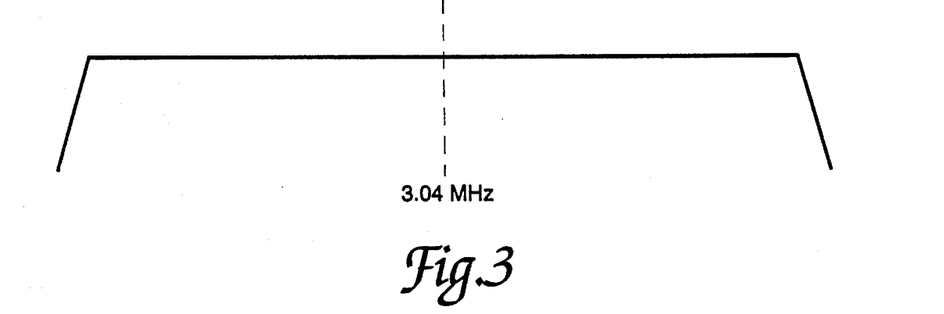
FIG. 3 is a graph illustrating the spectrum of a 6 MHz HDTV television channel.

FIG. 3 illustrates the spectrum of a typical all digital HDTV signal. It will be observed that the spectrum is substantially flat across the 6 MHz channel except for the Nyquist slopes on either side thereof. Preferably, although not necessarily limited thereto, the HDTV signal is transmitted as a pair of double sideband, amplitude modulated, suppressed carrier quadrature components. The suppressed HDTV carrier may be regenerated in the receiver by locking to the transmitted data or, alternatively, a small pilot signal at the frequency of the suppressed carrier may be transmitted to facilitate carrier regeneration.

According to an important aspect of the invention, the location of the suppressed carrier of the HDTV signal is chosen to facilitate simultaneous reduction of both the NTSC picture carrier and chroma subcarrier in an HDTV receiver. In particular, the HDTV suppressed carrier signal is chosen to have a nominal frequency precisely mid-way between the NTSC picture carrier and chroma subcarrier. As shown in FIG. 3, the HDTV suppressed carrier is therefore chosen to have a nominal frequency of about 3.04 MHz such that it is spaced 1.79 MHz from both the picture carrier and the chroma subcarrier of an NTSC co-channel signal. As will be described in further detail hereinafter, the HDTV carrier may be somewhat displaced from this nominal frequency to facilitate other features of the invention, without substantially detracting from the advantages otherwise achieved by so selecting the HDTV carrier frequency.

Figure 4:
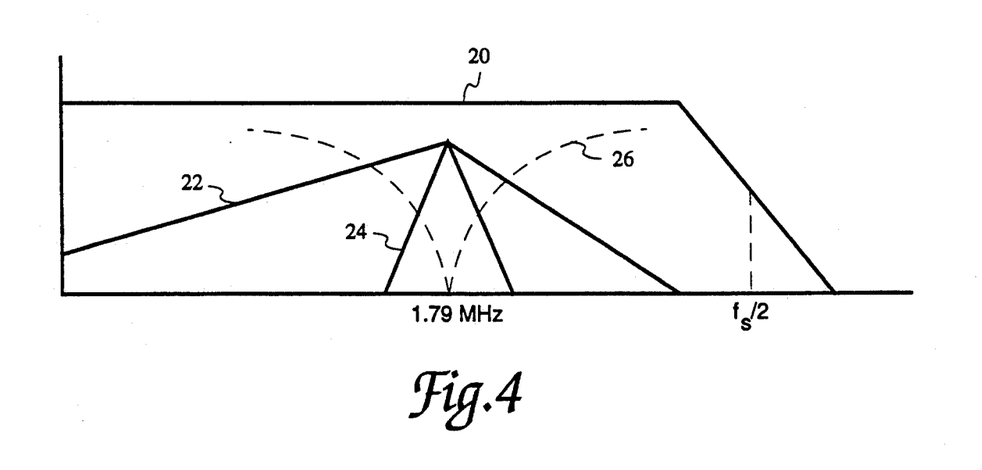
FIG. 4 is a graph illustrating the response of an HDTV receiver to co-channel HDTV and NTSC transmissions.

The advantage of selecting the suppressed HDTV carrier in the manner set forth above is illustrated in FIG. 4, which depicts the response of the HDTV receiver at the output of the picture detector. As illustrated in this FIGURE, the nominal response of the HDTV receiver is substantially flat across the channel as represented by curve 20, and is characterized by a Nyquist bandwidth of fs/2, where fs is the sampling rate of the digital samples comprising the received HDTV video signal (hereinafter referred to as the data sampling rate). The HDTV signal is preferably produced by a synchronous detector in response to a regenerated carrier having a frequency equal to the suppressed HDTV carrier. In the presence of an NTSC co-channel signal, detection in response to the 3.04 MHz regenerated carrier will also provide a pair of interferring beat signals substantially coincident at 1.79 MHz. In particular, a first 1.79 MHz interferring beat signal will be produced in response to the regenerated carrier and the NTSC picture carrier and a second 1.79 MHz beat signal will be produced in response to the regenerated carrier and the NTSC chroma subcarrier. The spectrum of the interfering NTSC picture and chroma beat signals are represented by curves 22 and 24 respectively.

Since the interfering NTSC picture and chroma beat signals coincide substantially at 1.79 MHz, a filter may be provided in the HDTV receiver to effectively reduce both interfering signals. This is illustrated in FIG. 4 by response 26 which has a notch at 1.79 MHz coinciding with both beat signals. It will be appreciated that selection of the HDTV suppressed carrier at 3.04 MHz thus facilitates the use of a filter for effectively reducing both beat signals which substantially coincide at a notch of the filter response characteristic. The use of any other HDTV carrier frequency would result in non-coincident NTSC co-channel picture and chroma beat frequencies, both of which could not therefore be optimally reduced by a single filter response.

As will be described in further detail hereinafter, in order to facilitate the design of a filter system including response 26 having a notch at 1.79 MHz, it is desirable that the data sampling rate fs have an integer relation to 1.79 Mhz. Thus the data sampling rate fs is preferably equal to N(1.79 MHz), which in turn is equal to Nfcs/2, where N is an integer and fcs is the frequency of the NTSC color subcarrier. Since the Nyquist bandwidth fs/2 of response 20 is slightly less than 3 MHz, the selection of N must result in a Nyquist bandwith close to about 2.7 MHz. Setting N=3 results in a Nyquist bandwidth of about 2.685 MHz which is sufficiently close to the desired value. The selection of N=3 also results in the data sampling rate fs being fixed at 3(1.79 MHz) which approximately equals 5.37 MHz and the notch of response 26 of FIG. 4 being provided at fs/3.

It may also be desirable to lock the data sampling rate fs to the horizontal scanning rate fh of the NTSC transmission to, for example, facilitate conversion between NTSC and HDTV encoded signals. Relating the video sampling rate fs to the NTSC horizontal scanning rate fh provides:

$$fs = 3\ fcs/2 = (3/2)(455fh/2) = 341.25fh.$$

Therefore, in order to establish an integral relation between fs and fh, fs can be selected to equal either 341fh or 342fh. In either case, the notch of response 26 will slightly deviate from the nominal frequency of 1.79 MHz, but this can be at least partially offset by slightly adjusting the frequency of the HDTV carrier so that the NTSC picture carrier beat coincides with the deviated notch. In particular, this may be achieved in the case where the video sampling rate fs is selected to be 341fh by decreasing the nominal HDTV carrier frequency (i.e. 3.04 MHz) by about 1.3 KHz or, in the case where fs is selected to be 342fh by increasing the nominal HDTV carrier frequency by about 3.9 KHz. It may also be desirable to further slightly deviate the HDTV carrier frequency by setting it equal to an integer multiple of one-half the NTSC horizontal line rate to, for example, facilitate the use of a line comb to recover certain components of the HDTV signal, such as a synch component.

In accordance with the foregoing, and referring back to FIG. 1, the HDTV transmitter 10 comprises a video source 30 receiving a clock signal Nfs from a clock generator 12 to provide a digital video signal having a bandwidth of up to about 37 MHz at a data sampling rate related to fs, where fs is substantially equal to 3 fcs/2. Although not limited thereto, the video signal provided by source 30 preferably comprises 787.5 progressively scanned lines per frame, 720 of which represent active video, having a vertical repetition rate corresponding to the NTSC field rate and a horizontal repetition rate corresponding to three times the NTSC horizontal scanning rate. The video signal developed by source 30 is applied to a video compressor 32 which compresses the 37 MHz video signal sufficiently to allow for its transmission through a standard 6 MHz television channel. The compressed video signal is then coupled to a precoder 34, which will be described in further detail hereinafter, and therefrom to a modulator 36 for transmission. Both compressor 32 and precoder 34 are operated in response to clock signal fs from clock generator 12, compressor 32 also being operated in response to clock signal Nfs. Modulator 36 is supplied with a carrier signal having a nominal frequency of 3.04 MHz by a carrier signal generator 38. The frequencies of the clock and carrier signals can, of course, be slightly adjusted from the nominal values a previously described. Transmission of the video signal may be effected by modulator 36 in the form of a pair of quadrature components each comprising a double-sideband, suppressed carrier signal. A small pilot at the carrier frequency may also be transmitted to facilitate regeneration of the carrier in receiver 100.

Receiver 100 includes a tuner and IF stage 110 tuned to the 6 MHz television channel over which the HDTV signal is transmitted. The tuned HDTV signal, together with a co-channel NTSC signal broadcast on the same channel by transmitter 200 in a nearby television service area, are converted to an IF frequency in stage 110 and coupled to the input of a synchronous detector 120. The output of stage 110 is also coupled to a clock circuit 122 which regenerates clock signal fs and to a carrier regenerator 130 which regenerates a signal having a frequency equal to the suppressed HDTV carrier. The regenerated carrier is applied to a second input of synchronous detector 120. The carrier signal may be regenerated in response to a transmitted pilot or by locking to the digital data representing the transmitted video signal. The output of synchronous detector 120, which is represented by the response curves of FIG. 4, thus includes the desired HDTV component, represented by curve 20, and the undesired NTSC co-channel picture and chroma beat components represented by curves 22 and 24 respectively. As described previously, both beat components coincide substantially at 1.79 MHz and are produced as a result of beating the regenerated HDTV carrier with the NTSC picture carrier and the NTSC chroma subcarrier.

The output of synchronous detector 120 is coupled to a filter and decoder stage 140. Stage 140 comprises a filter having a response represented by curve 26 of FIG. 4. This response includes a null at fs/3 (i.e. about 1.79 MHz) to cancel or substantially cancel both the interfering NTCS picture and chroma beats which are substantially coincident near 1.79 Hz. As explained in U.S. Pat. Nos. 5,132,797 and 5,086,340, while a filter may be provided for producing nulls to reduce interfering NTSC co-channel signals in an HDTV receiver, it may also introduce intersymbol interference in the received HDTV digital video data. This problem may be avoided by the use of precoder 34 in the HDTV transmitter to condition the compressed digital HDTV video signal as fully explained in U.S. Pat. No. 5,086,340.

Figure 5A:
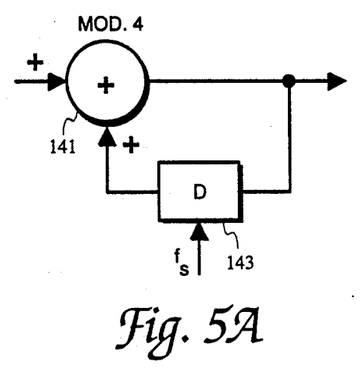
FIGS. 5A and 5B are block diagrams of complementary circuits which may be used in the transmitter and receiver respectively of FIG. 1 in accordance with the invention.
Figure 5B:
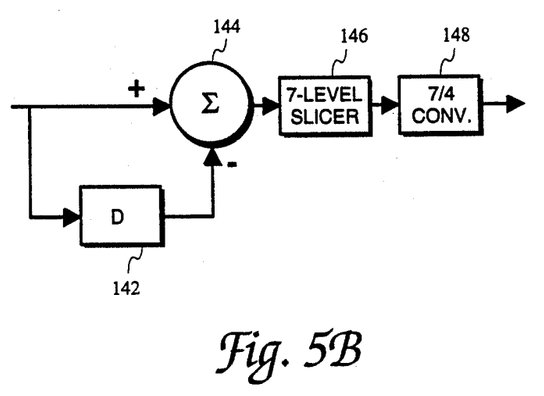
Figure 6A:
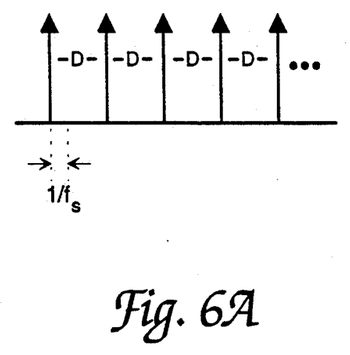
FIGS. 6A and 6B depict the impulse response characteristics of the circuits shown in FIGS. 5A and 5B respectively.
Figure 6B:
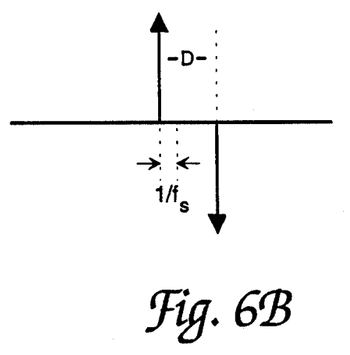

An exemplary precoder circuit and a complimentary filter, preferably comprising a comb filter, are illustrated in FIGS. 5A and 5B respectively. The comb filter comprises a feedforward circuit coupling the output of synchronous detector 120 to the input of a delay circuit 142 and to one input of a summer 144. The output of delay circuit 142 is coupled to a second input of summer 144. Summer 144 subtracts the delayed signal from the undelayed signal and, assuming the use of four level digital video samples, couples the result to a 7-level slicer 146. The output of slicer 146 is coupled to a 7-level to 4-level converter 148 which maps the seven level output of slicer 146 to a four level output corresponding to the demodulated signal produced at the output of synchronous detector 120. The impulse response of the comb filter is illustrated in FIG. 6B. The complimentary precoder of FIG. 5A comprises a feedback circuit comprising a modulo-4 adder 141 receiving the output of compressor 32 at a first input. The output of adder 141 is fed back through a delay 143 to a second input of adder 141. The impulse response of the precoder is illustrated in FIG. 6A. As fully explained in previously mentioned U.S. Pat. No. 5,086,340, the use of the precoder in transmitter 10 facilitates the use of 7-level slicer 146 and 7-level to 4-level converter 148 for eliminating the interference introduced in the received HDTV digital video samples by the comb filter in receiver 100.

Figure 7:
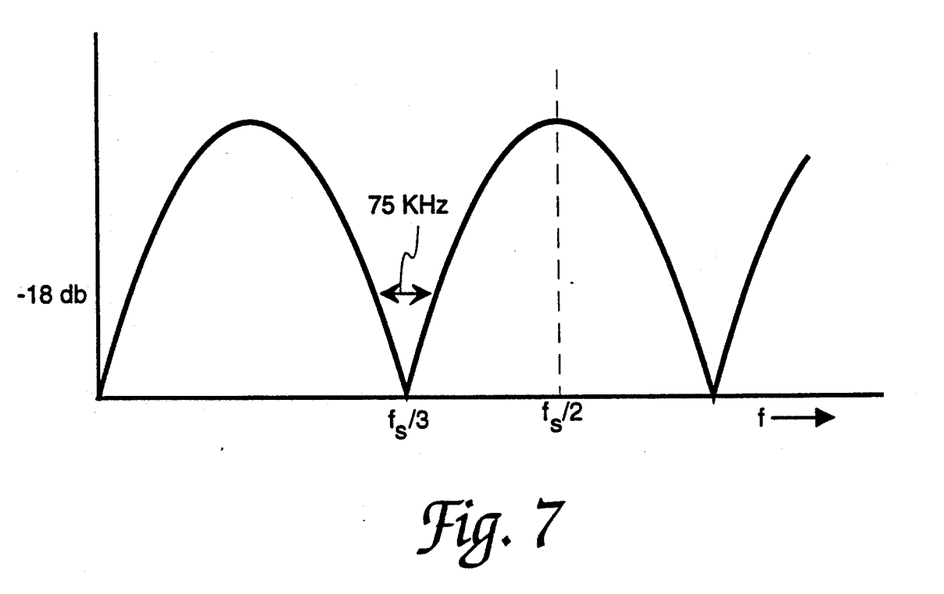
FIG. 7 is a graph illustrating the frequency domain response of the circuit shown in FIG. 5B.
Figure 8:
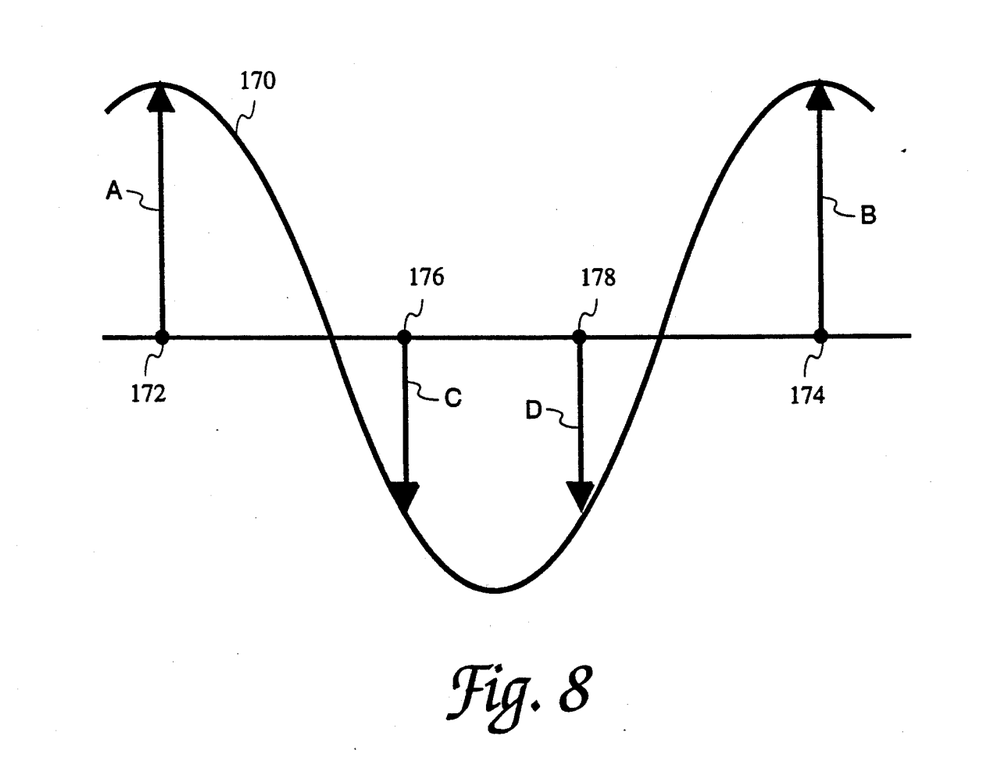
FIG. 8 is a graph of one cycle of a 1.79 MHz interference component useful in explaining the operation of the circuit of FIG. 5B.

In order to provide the desired complimentary operation of the precoder and comb filter illustrated in FIGS. 5A and 5B, the delays characterizing delay circuits 142 and 143 must be identical. Moreover, the delay characterizing the precoder must be an integral multiple of the data sampling rate fs, i.e. $D=N(1/fs)$, since the precoder 141 performs a purely digital operation. As a consequence, the delay characterizing delay circuit 142 of the comb filter must also be $D=N(1/fs)$. The frequency response of the comb filter of FIG. 5B with N set equal to 3 is illustrated in FIG. 7 and will be seen to include a notch at the desired frequency of fs/3. At the −18db point, the notch has a width of about 75 KHz. The manner in which this notch is achieved is most clearly shown in FIG. 8. Due to the selection of the video sampling rate fs=3(1.79 z), each cycle of the 1.79 MHz beat component 170 is effectively divided into three 120 degree intervals by the HDTV video samples. As a consequence, the interference component characterizing an HDTV sample will be cancelled by the comb filter of FIG. 5B which subtracts therefrom a corresponding interference component displaced by one cycle (i.e. 3/fs) of the 1.79 MHz beat 170. Thus, for example, interference component A occurring at sample time 172 is cancelled by interference component B occurring one cycle later at sampling time 174. It will be appreciated that any interference component will be cancelled in a like manner regardless of its phase.

Figure 9A:
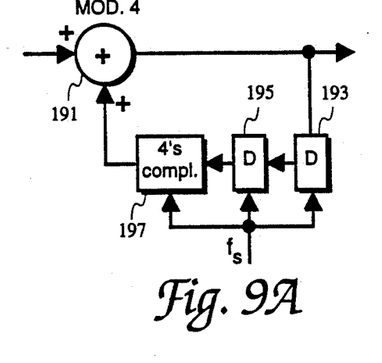
FIGS. 9A and 9B are block diagrams of alternate complementary circuits which may be used in the transmitter and receiver of FIG. 1 in place of the circuits of FIGS. 5A and 5B respectively.
Figure 9B:
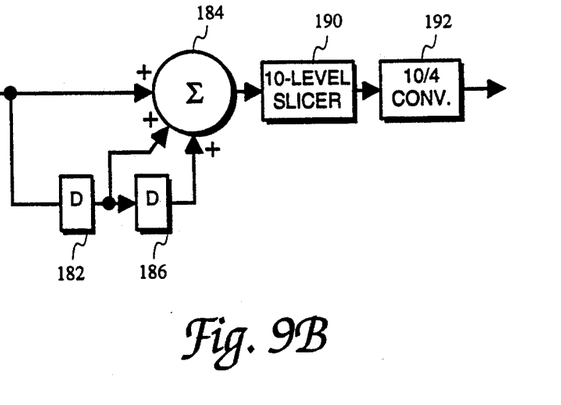
Figure 10A:
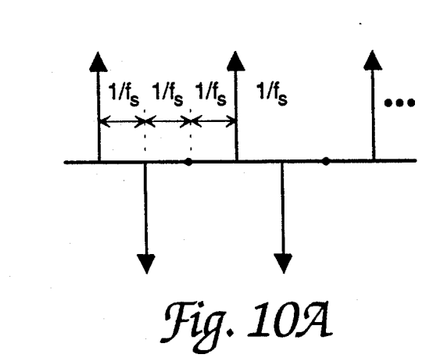
FIGS. 10A and 10B depict the impulse response characteristics of the circuits shown in FIGS. 9A and 9B respectively.
Figure 10B:
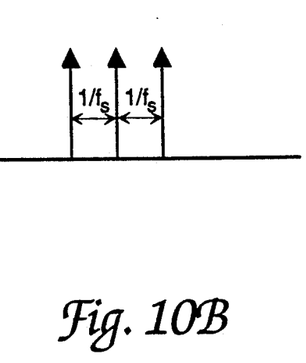

An alternate configuration of precoder and comb filter are illustrated in FIGS. 9A and 9B respectively, the impulse responses of which are shown in FIGS. 10A and 10B respectively. The comb filter of FIG. 9B also comprises a feedforward circuit in which the output of synchronous detector 120 is coupled to the input of a first delay circuit 182 and to one input of a summer 184. The output of delay circuit 182 is coupled to a second input of summer 184 and through a second delay circuit 186 to a third input of summer 184. Each of the delay circuits 182, 186 is characterized by a delay corresponding to one video sample period, i.e. 1/fs. Summer 184 sums the signals at its three inputs and provides an output to a 10-level slicer 190. The output of slicer 190 is applied to a 10-level to 4-level converter 192 which maps the 10-level output of slicer 190 to a 4-level output corresponding to the demodulated signal provided by synchronous detector 120.

Figure 11:
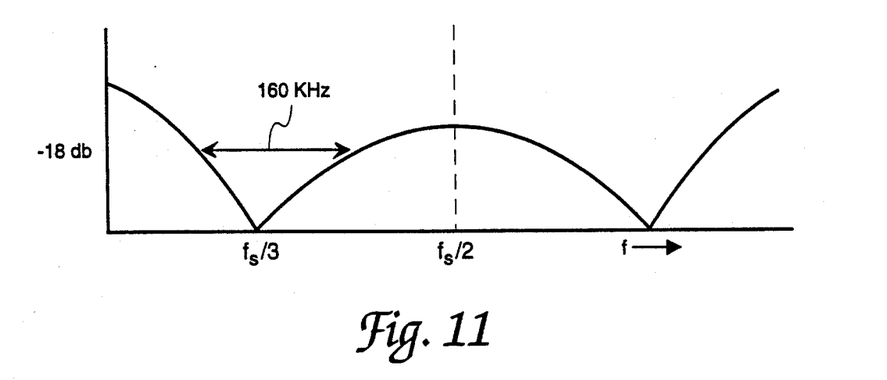
FIG. 11 is a graph illustrating the frequency domain response of the circuit shown in FIG. 9B.

The 10-level slicer 190 and 10-level to 4-level converter 192 used in the embodiment of FIG. 9B are required because of the additional intersymbol interference created by summing the outputs of the two separate delay circuits 182 and 186 in the comb filter. While this slightly degrades the signal-to-noise performance of the circuit, this degradation is offset by the improved frequency response characteristic achieved as shown in FIG. 11. In particular, it will be initially seen that the response has a much wider notch centered at fs/3 than the embodiment of FIG. 5B, the notch having a width of about 160 KHz at −18db. Also, the response attenuates the NTSC audio carrier at the channel edge in contrast to the embodiment of FIG. 5B which provided no such attenuation.

The notch fs/3 is achieved in the embodiment of FIG. 9B by summing interference components occurring at three successive HDTV sample times as indicated by the impulse response of FIG. 10B. Thus, referring to FIG. 8, the interference component A occurring at HDTV sample time 172 is cancelled by summing it with the interference components C and D occurring at HDTV sample times 176 and 178 respectively. As in the case of the embodiment of FIG. 5B, any other interference component will be cancelled in a like manner regardless of its phase.

The complementary precoder circuit of FIG. 9A comprises a feedback circuit comprising a modulo-4 adder 191 receiving the output of compressor 32 at a first input. The output of adder 191 is fed back through a pair of delay circuits 193, 195, each characterized by a delay corresponding to 1/fs, to the input of a 4's complement circuit 197. The output of 4's complement circuit 197 is applied to the second input of adder 191 which therefore effectively subtracts the feedback signal from the input signal to produce the impulse response in FIG. 10A.

Also, in the absence of co-channel interference from an NTSC transmitter, a complementary feed-forward decoder can be used in either of the embodiments of FIG. 5B or FIG. 9B to decode the precoded signal as explained in U.S. Pat. No. 5,086,340. This avoids the noise degradation introduced by the comb filters.

Finally, referring back to FIG. 1, the output of the comb filter and decoder 140 is coupled to an expansion circuit 150 for reconstructing a wideband video signal representing the original 37 MHz video source signal. The reconstructed signal is applied to a display 160 for displaying the reconstructed image.

It will be apparent to those skilled in the ar that while the system set forth herein utilizes a four digital level video data signal, the present invention may be utilized in other digital systems using other digital encoding formats.

What has thus been shown is a high definition television transmission system which substantially reduces NTSC co-channel interference without significantly degrading HDTV receiver performance. The system shown is capable of application to numerous types of digital processing formats for high definition television systems.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

I claim:

1. A method of transmitting a television signal comprising:
   providing an N-level digitally encoded signal at a sample rate substantially equal to 3/2 the NTSC color subcarrier frequency;
   generating a carrier signal;
   modulating said carrier signal with said N-level digitally encoded signal;
   transmitting said modulated carrier signal; and
   receiving and demodulating said transmitted signal.

2. The method of claim 1 wherein said sample rate is substantially equal to 341 times the NTSC horizontal scanning rate.

3. The method of claim 1 wherein said sample rate is substantially equal to 342 times the NTSC horizontal scanning rate.

4. The method of claim 1 wherein said carrier signal has a frequency substantially mid-way between the picture carrier and color subcarrier frequencies of a selected NTSC encoded television channel.

5. The method of claim 1 wherein said sample rate is substantially equal to 341 times the NTSC horizontal scanning rate and wherein said carrier signal has a frequency slightly less than the frequency mid-way between the picture carrier and color subcarrier frequencies of a selected NTSC encoded television channel.

6. The method of claim 1 wherein said sample rate is substantially equal to 342 times the NTSC horizontal scanning rate and wherein said carrier signal has a frequency slightly greater than the frequency mid-way between the picture carrier and color subcarrier frequencies of a selected NTSC encoded television channel.

7. A method of transmitting a television signal comprising:
   providing an N-level digitally encoded signal at a predetermined sampling rate;
   generating a carrier signal having a frequency substantially mid-way between the picture carrier and color subcarrier frequencies of a selected NTSC encoded television channel;
   modulating said carrier signal with said N-level digitally encoded signal;
   transmitting said modulated carrier signal; and
   receiving and demodulating said transmitted signal.

8. The method of claim 7 wherein said N-level video signal is characterized by a sampling rate substantially equal to 3/2 the NTSC color subcarrier frequency.

9. The method of claim 8 wherein said sample rate is substantially equal to 341 times the NTSC horizontal scanning rate and wherein said carrier signal has a frequency slightly less than the frequency mid-way between the picture carrier and color subcarrier frequencies of a selected NTSC encoded television channel.

10. The method of claim 8 wherein said sample rate is substantially equal to 342 times the NTSC horizontal scanning rate and wherein said carrier signal has a frequency slightly greater than the frequency mid-way between the picture carrier and color subcarrier frequencies of a selected NTSC encoded television channel.

11. A method of transmitting a television signal comprising:
   providing an N-level digitally encoded signal at a sample rate substantially equal to 3/2 the NTSC color subcarrier frequency;
   generating a carrier signal having a frequency substantially mid-way between the picture carrier and color subcarrier frequencies of a selected NTSC encoded television channel;
   modulating said carrier signal with said N-level digitally encoded signal;
   transmitting said modulated carrier signal; and
   receiving and demodulating said transmitted signal.

12. The method of claim 11 wherein said sample rate is substantially equal to 341 times the NTSC horizontal scanning rate and wherein said carrier signal has a frequency slightly less than the frequency mid-way between the picture carrier and color subcarrier frequencies of a selected NTSC encoded television channel.

13. The method of claim 11 wherein said sample rate is substantially equal to 342 times the NTSC horizontal scanning rate and wherein said carrier signal has a frequency slightly greater than the frequency mid-way between the picture carrier and color subcarrier frequencies of a selected NTSC encoded television channel.

14. A television signal receiver comprising:
   means for receiving a digitally encoded signal modulating a carrier signal having a frequency substantially mid-way between the picture carrier and color subcarrier frequencies of a selected NTSC encoded television channel;
   means for regenerating said carrier signal; and
   demodulating means responsive to said regenerated carrier signal for demodulating said received modulated digitally encoded signal.

15. The receiver of claim 14 wherein said received digitally encoded signal comprises an N-level video signal characterized by a sampling rate substantially equal to 3/2 the NTSC color subcarrier frequency.

16. The receiver of claim 15 wherein said sample rate is substantially equal to 342 times the NTSC horizontal scanning frequency.

17. The receiver of claim 15 wherein said sample rate is substantially equal to 341 times the NTSC horizontal scanning frequency.

18. The receiver of claim 15 wherein said sample rate is substantially equal to 341 times the NTSC horizontal scanning rate and wherein said carrier signal has a frequency slightly less than the frequency mid-way between the picture carrier and color subcarrier frequencies of a selected NTSC encoded television channel.

19. The receiver of claim 15 wherein said sample rate is substantially equal to 342 times the NTSC horizontal scanning rate and wherein said carrier signal has a frequency slightly greater than the frequency mid-way between the picture carrier and color subcarrier frequencies of a selected NTSC encoded television channel.

20. A television signal receiver comprising:
   means for receiving an N-level digitally encoded signal modulating a selected carrier signal, said N-level signal having a sampling rate fs substantially equal to 3/2 the NTSC color subcarrier frequency; and
   means for demodulating said received N-level signal.

21. The receiver of claim 20 wherein said carrier signal has a frequency substantially mid-way between the picture carrier and color subcarrier frequencies of a selected NTSC encoded television channel.

22. The receiver of claim 21 wherein said sample rate is substantially equal to 342 times the NTSC horizontal scanning frequency.

23. The receiver of claim 21 wherein said sample rate is substantially equal to 341 times the NTSC horizontal scanning frequency.

24. The receiver of claim 21 wherein said sample rate is substantially equal to 341 times the NTSC horizontal scanning rate and wherein said carrier signal has a frequency slightly less than the frequency mid-way between the picture carrier and color subcarrier frequencies of a selected NTSC encoded television channel.

25. The receiver of claim 21 wherein said sample rate is substantially equal to 342 times the NTSC horizontal scanning rate and wherein said carrier signal has a frequency slightly greater than the frequency mid-way between the picture carrier and color subcarrier frequencies of a selected NTSC encoded television channel.

26. A television signal receiver comprising:
   means for receiving an N-level digitally encoded signal modulating a carrier signal having a frequency substantially mid-way between the picture carrier and color subcarrier frequencies of a selected NTSC encoded television channel, said N-level digitally encoded signal having a sampling rate substantially equal to 3/2 the NTSC color subcarrier frequency; and
   means for demodulating said received N-level digitally encoded signal.

27. The receiver of claim 26 wherein said sample rate is substantially equal to 342 times the NTSC horizontal scanning frequency.

28. The receiver of claim 26 wherein said sample rate is substantially equal to 341 times the NTSC horizontal scanning frequency.

29. The receiver of claim 26 wherein said sample rate is substantially equal to 341 times the NTSC horizontal scanning rate and wherein said carrier signal has a frequency slightly less than the frequency mid-way between the picture carrier and color subcarrier frequencies of a selected NTSC encoded television channel.

30. The receiver of claim 26 wherein said sample rate is substantially equal to 342 times the NTSC horizontal scanning rate and wherein said carrier signal has a frequency slightly greater than the frequency mid-way between the picture carrier and color subcarrier frequencies of a selected NTSC encoded television channel.

* * * * *